2,786,066

DIEPOXIDES OF CYCLOALIPHATIC ESTERS OF MONOETHYLENICALLY UNSATURATED FATTY ACIDS

Frederick C. Frostick, Jr., South Charleston, and Benjamin Phillips, Charleston, W. Va., assignors to Union Carbide and Carbon Corporation, a corporation of New York No Drawing. Application October 7, 1954,
Serial No. 461,021

9 Claims. (Cl. 260—348)

This invention relates to a new series of organic chemical compounds and it has for an object the provision of new types of diepoxide compounds which are useful in the plastics and resins industry. More particularly this invention is directed to the diepoxides of certain aliphatic esters of monoethylenically unsaturated fatty acids and to a process for the preparation of these novel compounds.

The compounds of this invention may be represented by the following general formula:

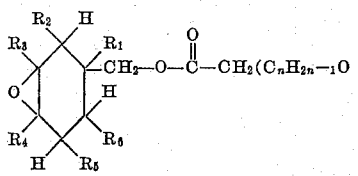

wherein the radicals $R_1$ through $R_6$ represent hydrogen or alkyl groups and the group $(C_nH_{2n-1}O)$ represents an epoxyalkyl group containing from 8 through 16 carbon atoms and composed of carbon, hydrogen, and one oxygen atom wherein the oxygen atom is attached to vicinal carbon atoms. The compounds of this invention may also be represented in another manner as shown by the following general formula:

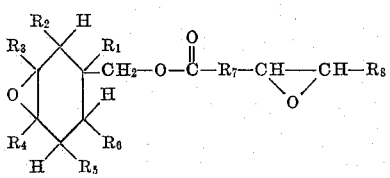

wherein the radicals $R_1$ through $R_6$ represent hydrogen atoms or alkyl groups, $R_7$ is an alkylene chain containing from 1 to 15 carbon atoms, and $R_8$ represents a hydrogen atom or an alkyl radical containing from 1 to 14 carbon atoms, the total number of carbon atoms in $R_7+R_8$ being from 7 to 15 carbon atoms.

A preferred class of compounds to which this invention is directed are those compounds represented by the structural formulae set forth above wherein $R_1$ through $R_6$ represent hydrogen or lower alkyl groups such as methyl, ethyl, propyl, isopropyl, butyl, isobutyl and tertiary butyl groups with the further provision that the total number of carbon atoms in the alkyl groups preferably does not exceed 10.

The compounds of this invention are useful as plasticizers and stabilizers for vinyl chloride polymers and copolymers and for various synthetic organic resins. One of the most interesting characteristics of the compounds of this invention is the difference in reactivity of the epoxide rings of the diepoxides. For example, the epoxide group attached to the cyclohexyl ring is more easily attacked by acidic reagents and active hydrogen compounds such as phenols, alcohols, carboxylic acids and the like than are the epoxide groups attached to the fatty acid portion of the molecule. Thus, selective reaction of the cyclohexyl epoxide group can be induced while the other epoxide group of the fatty acid portion is left unattacked. By virtue of this selective reactivity of the epoxy groups of the compounds of this invention, these compounds may be used in making soluble, fusible resins capable of being thermoset. Such thermosetting resins are of value for castings, surface coatings, and laminating.

The compounds of this invention are prepared by the reaction of peracetic acid and a 3-cyclohexenylmethyl ester of a monoethylenically unsaturated fatty acid. The reaction whereby the compounds of this invention are prepared may be illustrated by the following general formula:

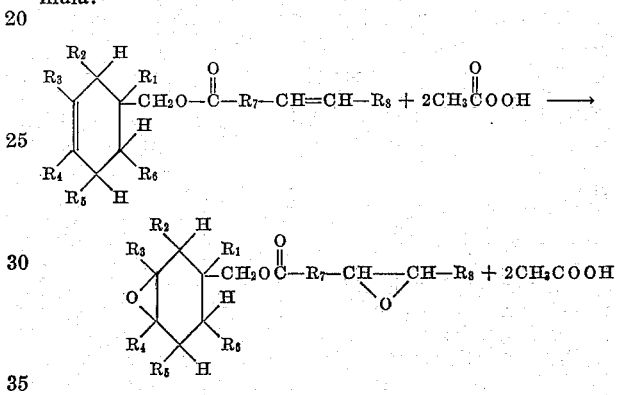

wherein the radicals $R_1$ through $R_6$ and $R_7$ and $R_8$ are as above defined.

The process of producing the compounds of this invention is carried out at temperatures in the range of $-25°$ C. to $150°$ C. At lower temperatures the rate of epoxidation is slow. At higher temperatures the rate of epoxidation is faster, but precautions are necessary to prevent the further reaction of the epoxide groups. Temperatures in the range of from $10°$ C. to $90°$ C. are preferably used to provide a suitable reaction rate and to avoid undesired side reactions. The diene starting material is conveniently charged to a reaction vessel and the theoretical quantity of peracetic acid is then added. Two or more moles of peracetic acid per mole of diene are usually added to the diene starting material. Both types of double bonds in the molecule are relatively easily attacked by the peracetic acid and the epoxidation of both types appears to proceed simultaneously. The reaction is allowed to proceed until approximately the theoretical amount of peracetic acid is consumed, which is determined by periodic tests for peracetic acid. The time is usually from about one to ten hours, depending on the temperature. In working up the crude reaction product it is preferred, although not absolutely necessary, to separate the by-product acetic acid from the epoxide rapidly, since the by-product acetic acid will react with the epoxide to form undesired products thus decreasing the overall yield of diepoxide product. The reaction mixture is then subjected to conventional recovery procedures for the recovery of the diepoxide product. The product can be recovered by extraction with a suitable solvent; continuous distillation or distillation under reduced pressures as desired, or a residue product may be taken.

The starting materials for the production of the diepoxides of this invention are the corresponding diolefins which may be represented by the following general formula:

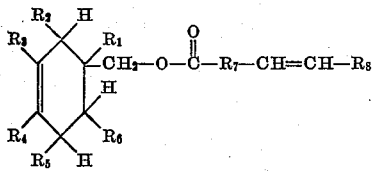

wherein $R_1$ through $R_6$, $R_7$ and $R_8$ are as above defined. These starting materials are prepared by esterification of a 3-cyclohexenylmethanol with the appropriate monoethylenically unsaturated aliphatic acid. The alcohols are generally obtained by the reduction of the corresponding aldehydes which are prepared by the Diels-Alder reaction of butadiene or a substituted butadiene with acrolein, crotonaldehyde, methacrolein and the like. A variety of cycloaliphatic aldehydes suitable for reduction to the corresponding alcohol can be produced having alkyl substituents on the ring when compounds such as acrolein, crotonaldehyde and methacrolein are reacted with dienes such as butadiene, piperylene, isoprene, 2,3-dimethyl, 1,3-pentadiene, and the like.

The preferred 3-cyclohexenylmethanols which contain alkyl groups attached to the cyclohexenyl ring are those with alkyl substituents having from one to four carbon atoms in the alkyl chain such as for example methyl, ethyl, propyl, isopropyl, butyl, isobutyl, tertiary butyl groups and the like.

Particularly preferred cyclohexenylmethanols to be used in producing the novel esters of this invention are 3-cyclohexenylmethanol and the methyl substituted 3-cyclohexenylmethanols which include representative compounds such as 1-methyl-3-cyclohexenylmethanol and 6-methyl-3-cyclohexenylmethanol.

The monoethylenic fatty acids which are suitable for use in preparing the starting compounds may be derived from any animal, vegetable or marine oil containing unsaturated fatty acids or they may be derived from the mixed fatty acids contained in such oils. Typical oils include soybean oil, safflower oil, linseed oil, cottonseed oil, tall oil and the like. More particularly, the monoethylenic fatty acids to be used in producing the novel esters of this invention are those fatty acids containing from ten and as many as eighteen carbon atoms. A variety of acids containing from ten to eighteen carbon atoms are available and include, for example, the decenoic acids, undecenoic acids, dodecenoic acids, hexadecenoic acids, octadecenoic acids and the like. Preferred monoethylenic fatty acids to be used in producing the novel esters of this invention are oleic acid, elaidic acid, myristoleic acid, palmitoleic acid, ricinoleic acid and erucic acid and mixtures of these acids.

The following examples will serve to illustrate the practice of the invention:

EXAMPLE 1

Preparation of 6-methyl-3-cyclohexenylmethyl oleate

A mixture of 2260 grams (8 moles) of oleic acid, 1056 grams (8.4 moles) of 6-methyl-3-cyclohexenylmethyl alcohol, 800 grams of toluene, and 13 grams of concentrated sulphuric acid was charged to a flask fitted with a distillation column and an esterification head. The contents of the flask were heated under reflux while water was removed as the lower layer of the distillate. During a period of four hours, 156 grams of water layer was obtained. The catalyst was neutralized with 100 mole percent excess of sodium acetate and, after filtration, the reaction solution was distilled. There was obtained 2736 grams (88 percent yield) of 6-methyl-3-cyclohexenylmethyl oleate having a boiling point of 205°–235° C. at 1–1.5 mm. of mercury absolute and a refractive index ($n_D^{30}$) of 1.4678–1.4704.

By following the procedure set forth above, various other esters of 3-cyclohexenylmethanol can be prepared. For example, it is possible to prepare 3-cyclohexenylmethyl lauroleate; 3-cyclohexenylmethyl myristoleate; 3-cyclohexenylmethyl palmitoleate; 3-cyclohexenylmethyl ricinoleate. Various esters of 3-cyclohexenylmethanol can also be prepared in which the cyclohexenyl ring contains an alkyl substituent. For example, by following the procedure set forth above esters such as 6-methyl-3-cyclohexenylmethyl lauroleate, 6-methyl-cyclohexenylmethyl myristoleate, 6 - methyl - 3 - cyclohexenylmethyl palmitoleate and 1-methyl-3-cyclohexenylmethyl ricinoleate can be prepared.

If desired, mixtures of various esters can be prepared by esterifying various vegetable oil fatty acids, animal oil fatty acids, or marine oil fatty acids with a selected 3-cyclohexenylmethanol.

EXAMPLE 2

Preparation of 3,4-epoxy-6-methylcyclohexenylmethyl 9,10-epoxystearate 6-methyl-3-cyclohexenylmethyl oleate (720 grams, 2.0 moles) was charged to a flask fitted with a stirrer, thermometer, and dropping funnel. To this was added over a period of seven hours 2820 grams of 24.2% solution of peracetic acid in acetone (684 grams, 9 moles of peracetic acid) while the temperature of the reaction mixture was maintained at 35–40° C. After the addition was completed the reaction was allowed to proceed for an additional hour at which time analysis of peracetic acid indicated that the theoretical amount had all been consumed. The reaction solution was then added dropwise to a still kettle containing ethylbenzene under reflux at 25 mm. mercury pressure absolute. During the addition, peracetic acid, acetone, acetic acid, an ethylbenzene were distilled at the head. The kettle was then stripped of low boiling material and there was obtained 883 grams of a light tan viscous liquid residue product (Gardner 1933 Color=1) which analyzed 83.5 percent diepoxide by the pyridine-hydrochloride method, 3.75 percent as the starting material, 6-methyl-3-cyclohexenylmethyl oleate, by bromine analysis for double bonds, and 0.3 percent acidity as oleic acid by titration with a base. The diepoxide product gave a saponification equivalent of 394.

In an analogous manner other diepoxides of cycloaliphatic esters of monoethylenically unsaturated fatty acids are prepared readily such as for example 3,4-epoxy-6-methylcyclohexylmethyl 5,6 - epoxylaurate; 3,4 - epoxycyclohexymethyl 9,10 - epoxymyristate; 3,4 - epoxycyclohexylmethyl 9,10-epoxypalmitate; 3,4-epoxycyclohexylmethyl 9,10-epoxystearate and 3,4-epoxy-1-methylcyclohexylmethyl 9,10-epoxystearate.

In the foregoing example the analysis for oxirane oxygen is based on its quantitative reaction with a measured excess of pyridine hydrochloride in pyridine to form the chlorohydrin. The amount of reagent consumed, which is determined by titrating the excess with alcoholic potassium hydroxide, is a measure of the epoxide originally present. A pyridine hydrochloride solution was prepared by conducting dry hydrogen chloride into freshly distilled pyridine until considerable pyridine hydrochloride had precipitated. The liquid was decanted and the normality of the liquid adjusted to 0.4 N. Into a heat-resistant pressure bottle containing 50 milliliters of 0.4 N pyridine hydrochloride was introduced a sample of epoxide calculated to use about 50 percent of the pyridine hydrochloride. The bottle was then closed and the contents heated in a steam bath for a period of two hours. At the end of that time the bottle and contents were cooled, 10 drops of bromocresol green indicator (10.15 grams per 100 milliliters of methanol) added, and the mixture titrated to a permanent blue endpoint with standard 0.2 N alcoholic potassium hydroxide. A blank was also run in precisely the same fashion except that the sample was omitted.

EXAMPLE 3

A resin (100 parts) analyzing 97 percent vinyl chloride and 3 percent vinyl acetate was mechanically mixed with 15.4 parts of 3,4-epoxy-6-methylcyclohexylmethyl 9,10-epoxystearate and 38.6 parts of dioctyl phthalate and the resulting mixture fluxed and milled on a heated, differential speed, two roll mill to form a sheet. The fluxed sheets, after severe testing, showed that the epoxide compound imparted good heat and light stability characteristics to the milled resin.

The plasticizing ability of 3,4-epoxy-6-methylcyclohexylmethyl 9,10-epoxystearate was established by determining the amount of epoxide required to impart an arbitrary flexibility to the vinyl chloride resin mentioned above.

A mixture of 100 parts of vinyl chloride resin and 60 parts of the epoxide were milled on a two-roll mill, fluxed and sheeted for five minutes at 158° C. and samples of the milled sheet were then compression molded for ten minutes at 158° C. Specimens tested indicated that the epoxide was an effective plasticizer.

What is claimed is:

1. Epoxy compounds having the general formula:

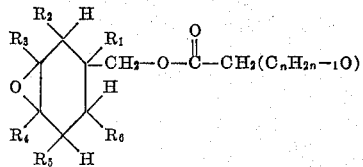

wherein the group ($C_nH_{2n-1}O$) represents an epoxy alkyl group containing from 8 through 16 carbon atoms and composed of carbon, hydrogen and one oxygen atom which is attached to vicinal carbon atoms and $R_1$ through $R_6$ represent members selected from the group consisting of hydrogen and lower alkyl groups and wherein the total number of carbon atoms in the alkyl groups does not exceed 10 carbon atoms.

2. Epoxy compounds having the general formula:

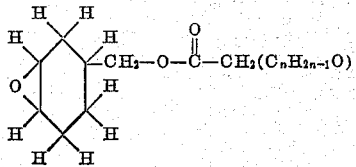

wherein the group ($C_nH_{2n-1}O$) represents an epoxy alkyl group containing from 8 through 16 carbon atoms and composed of carbon, hydrogen and one oxygen atom which is attached to vicinal carbon atoms.

3. Epoxy compounds having the general formula:

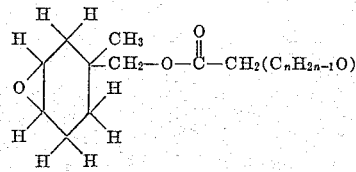

wherein the group ($C_nH_{2n-1}O$) represents an epoxy alkyl group containing from 8 through 16 carbon atoms and composed of carbon, hydrogen and one oxygen atom which is attached to vicinal carbon atoms.

4. Epoxy compounds having the general formula:

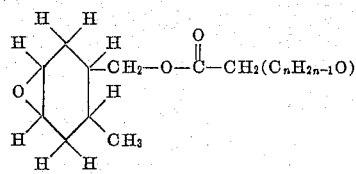

wherein the group ($C_nH_{2n-1}O$) represents an epoxy alkyl group containing from 8 through 16 carbon atoms and composed of carbon, hydrogen and one oxygen atom which is attached to vicinal carbon atoms.

5. 3,4-epoxycyclohexylmethyl 9,10-epoxymyristate.
6. 3,4-epoxycyclohexylmethyl 9,10-epoxypalmitate.
7. 3,4-epoxycyclohexylmethyl 9,10-epoxystearate.
8. 3,4 - epoxy - 1 - methylcyclohexylmethyl 9,10 - epoxystearate.
9. 3,4 - epoxy - 6 - methylcyclohexylmethyl 9,10 - epoxystearate.

References Cited in the file of this patent
UNITED STATES PATENTS

| | | |
|---|---|---|
| 2,485,160 | Niederhauser | Oct. 18, 1949 |
| 2,541,670 | Segall | Feb. 13, 1951 |